United States Patent [19]

Montes

[11] Patent Number: 4,647,479

[45] Date of Patent: Mar. 3, 1987

[54] PRIMER OVER HAND-CLEANED RUSTED STEEL

[75] Inventor: Ernesto Montes, Santa Ana, Calif.

[73] Assignee: Ameron, Inc., Monterey Park, Calif.

[21] Appl. No.: 841,014

[22] Filed: Mar. 17, 1986

Related U.S. Application Data

[63] Continuation of Ser. No. 641,251, Aug. 16, 1984, abandoned.

[51] Int. Cl.$^4$ ................................................ A21D 4/00
[52] U.S. Cl. ................................... 427/327; 106/14.05; 106/287.16; 427/384; 427/397.7; 427/402
[58] Field of Search ................... 427/327, 384, 397.7, 427/402; 106/14.05, 287.16

[56] References Cited

U.S. PATENT DOCUMENTS

| | | | |
|---|---|---|---|
| 3,056,684 | 10/1962 | Lopata et al. | 106/14 |
| 3,202,517 | 8/1965 | Jarboe et al. | 106/14 |
| 3,562,124 | 2/1971 | Leon et al. | 204/148 |
| 3,634,109 | 1/1972 | Mago | 106/14 |
| 3,660,119 | 5/1972 | Oken | 106/1 |
| 3,730,743 | 5/1973 | McLeod | 106/1 |
| 3,730,746 | 5/1973 | Boaz | 106/287 SE |
| 3,778,280 | 12/1973 | Dittrich | 106/1 |
| 3,849,141 | 11/1974 | Palm et al. | 106/1 |
| 3,859,101 | 1/1975 | Slater | 106/1 |
| 3,917,648 | 11/1975 | McLeod | 106/1 |
| 3,941,609 | 3/1976 | Stern | 106/290 |
| 3,997,501 | 12/1976 | McLeod | 106/1.17 |
| 4,084,971 | 4/1978 | Ginsberg | 106/1.17 |
| 4,086,095 | 4/1978 | McLeod | 106/1.17 |
| 4,086,096 | 4/1978 | McLeod | 106/1.17 |
| 4,110,117 | 8/1978 | McLeod | 106/1.17 |
| 4,208,452 | 6/1980 | Keithler | 106/14.21 |
| 4,239,539 | 12/1980 | Ginsberg et al. | 106/1.17 |
| 4,290,811 | 9/1981 | Brown et al. | 106/1.17 |
| 4,304,707 | 12/1981 | Kuehn | 260/37 R |
| 4,326,888 | 4/1982 | Frew | 106/14.14 |

*Primary Examiner*—Lorenzo B. Hayes
*Attorney, Agent, or Firm*—Christie, Parker & Hale

[57] ABSTRACT

A corrosion-inhibiting coating composition for application onto rusted steel or iron surfaces is disclosed. The coating composition comprises an organic silicate, citric acid, and a non-aqueous solvent. The organic silicate is preferably present in an amount sufficient to provide about 12% to 24% silicon dioxide in the cured coating from the composition and is preferably pre-hydrolyzed in an amount of about 70% to 90%. Citric acid is preferably present in an amount of about 0.1 to 0.2 grams per cubic centimeter of the coating composition. Dissolution and complexation of the rust by the citric acid provides a pigment which causes the organic silicate to become a film-forming binder. Zinc chloride is preferably added to the composition to increase the rate of rust dissolution and to improve binder properties.

18 Claims, No Drawings

PRIMER OVER HAND-CLEANED RUSTED STEEL

CROSS-REFERENCE TO RELATED APPLICATIONS

This is a continuation of application Ser. No. 641,251 filed Aug. 16, 1984 now abandoned.

FIELD OF THE INVENTION

This invention relates to corrosion-inhibiting coating compositions and more particularly to a coating composition containing an organic silicate that is both corrosion inhibiting and rust dissolving.

BACKGROUND OF THE INVENTION

A wide variety of coating compositions have been developed to protect metal surfaces from corrosion. Some of these coatings simply rely on the formation of an impenetrable barrier between the metal surface and the surrounding environment. Others include a corrosion-inhibiting filler or the like to prevent corrosion. For example, fillers such as zinc and lead have been used extensively in coating compositions to provide anodic protection against corrosion.

Such coatings require that the surface of the metal to be protected be scrupulously clean. Otherwise, the protection is lost either by loss of adhesion of the coating or by loss of contact between the corrosion-inhibiting filler and the metal. Thus, if the coating composition is to be applied to an already rusted surface, that surface must be first cleaned to remove virtually all of the rust. Typically, this is done by sand blasting or the like.

In many industrial situations, however, conditions such as cost, pollution, operation interruption, and the like do not permit extensive surface preparation. In such a situation, surface preparation may be limited to hand cleaning with, for example, a wire brush. This would remove large rust deposits but would not clean the surface sufficiently for the application of a conventional rust-inhibiting coating composition. In such a situation, the coating composition needs to dissolve rust in addition to inhibit rust formation.

SUMMARY OF THE INVENTION

There is provided a rust-dissolving and corrosion-inhibiting primer coating composition for application onto rusted iron and steel surfaces. The coating composition comprises an organic silicate, citric acid, and a non-aqueous solvent.

The organic silicate is preferably present in an amount sufficient to provide at least about 12%, preferably from about 12% to about 24%, and more preferably from about 14% to about 18% by weight silicon dioxide in a cured coating from the composition. The organic silicate is preferably pre-hydrolized in an amount from about 75% to about 90% and more preferably from about 80% to about 85%. The presently preferred organic silicate is ethyl silicate.

Citric acid is present in the composition in an amount sufficient to complex substantially all of the dissolved iron. Preferably the citric acid is present in an amount of at least about 0.01 grams per cubic centimeter of the coating composition and more preferably from about 0.1 to about 0.2 grams per cubic centimeter of the coating composition. The balance of the composition is a nonaqueous solvent, preferably isopropyl alcohol.

The pH of the composition is preferably maintained within the range of from about 3.0 to about 4.5, more preferably from about 3.5 to about 4.0. Acidic or alkaline agents may be added to adjust the pH of the composition to the preferred range.

In a particularly preferred embodiment of the invention, the coating composition also comprises one or more additional acidic agents to increase the rate of rust dissolution into the coating composition. Zinc chloride is presently preferred.

DETAILED DESCRIPTION

In accordance with this invention, there is provided a corrosion-resistant and rust-dissolving coating composition comprising an organic silicate, citric acid, and a non-aqueous solvent in a consistency suitable for brushing, spraying or the like on rusted steel or other rusted ferrous materials.

The organic silicate has the formula:

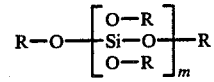

wherein m is from about 1 to about 10 and preferably about 5 and R is independently selected from the group consisting of alkyl and alkoxyalkyl radicals containing less than about 6 carbon atoms.

The presently preferred organic silicate is ethyl silicate. Exemplary of a commercially available ethyl silicate which can be used is "Ethyl Silicate-40." "Ethyl Silicate-40" is the trade name for an ethyl polysilicate available from Union Carbide Chemical Company. This material is a light-colored liquid having a silicon dioxide content of about 40% and comprising polysilicates having an average of 5 silicon atoms per molecule, i.e., m equals 5, although individual molecules can comprise only 1 silicon atom. "Ethyl Silicate-40" also has a degree of hydrolysis of about 40%.

The ability of the coating composition to form a strong, durable adhesive coating depends in part upon the amount of organic silicate present in the composition and on the degree of hydrolysis of the organic silicate. Accordingly, the organic silicate is present in the composition in an amount which provides at least about 12%, preferably from about 12% to about 24%, and more preferably from about 14% to about 18% by weight silicon dioxide in a cured coating from the composition, the coating being that which results after the composition has been applied onto a surface and has cured.

Compositions in which the organic silicate is present in an amount which provides less than about 12% silicon dioxide in a cured coating are not preferred because such cured coatings tend to exhibit poor adhesion, and consequently, tend to flake off of the surface to which the composition is applied.

While compositions in which the organic silicate is present in an amount which provides more than about 24% silicon dioxide in the cured coating may be used, such compositions are not preferred because they tend to have undesirably short shelf lives, i.e., shelf lives of less than six months. Accordingly, compositions in which the organic silicate is present in an amount which provides from about 12% to about 24% silicon dioxide in the cured coating are preferred because they provide satisfactory adhesion and exhibit a shelf life of at least six months. Compositions in which the organic silicate is present in an amount which provides from about 14% to about 18% silicon dioxide in the cured coating are particularly preferred because it is believed that such compositions offer the best combination of adhesion and shelf life.

Along with the amount of organic silicate in the composition, the degree of hydrolysis of the organic silicate affects the adhesion of the coating and the shelf life of the composition. Generally, as the degree of hydrolysis of the organic silicate increases, both the adhesion of the coating composition to the surface that the composition is applied and the shelf life of the coating composition tend to decrease. However, as the degree of hydrolysis increases, the viscosity of the coating composition increases and the cure time of the coating composition decreases. Both effects are desirable.

It has been found that satisfactory adhesion and shelf life can be obtained when the degree of hydrolysis of the organic silicate does not exceed about 90% to 95%. Accordingly, it is preferred that the organic silicate be pre-hydrolyzed in an amount from about 75% to about 90%, and more preferably, from about 80% to about 85%. Such coating compositions produce coatings which have good adhesion to most surfaces, cure quickly, have shelf lives of at least six months, and have sufficiently high viscosity to enable their application onto vertical surfaces.

Pre-hydrolysis of the organic silicate is preformed by adding water to the organic silicate. However, because organic silicates tend to be immiscible with water, prehydrolysis is typically performed in the presence of a mutual solvent. Preferably, a volatile solvent is used so that quick drying of the composition and formation of a coating will occur. Exemplary of solvents which can be used are acetone, isopropanol, ethanol, butanol, pentanone, ethylene glycol ethyl ether, and methylisobutyl ketone. Isopropanol is presently preferred.

The degree of hydrolysis of the organic silicate is determined by the ratio of the number of moles of water used to hydrolyze the organic silicate to the number of moles of water required for complete hydrolysis. Complete hydrolysis requires one mole of water per two moles of the organic group of the organic silicate.

The hydrolysis of organic silicates at a neutral pH is generally too slow to enable the use of the organic silicate as a binder in coating formulations. However, in either acidic or basic mediums, the rate of hydrolysis is appreciably increased. It is presently preferred that an acidic medium be used to promote hydrolysis because the final pH of the coating must be acidic.

In acid conditions, achieved by adding small amounts of an acid to the water used in the hydrolysis, the equilibrium conditions are reached in hours. The equilibrium conditions, which are:

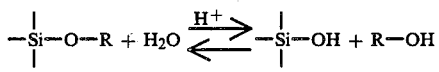

and

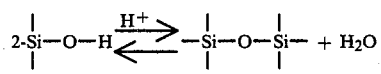

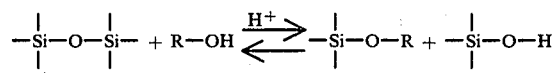

all occur simultaneously.

Dilute aqueous hydrochloric acid is preferably used to catalyze the hyrolysis and condensation of the organic silicate. Other acids that can be used as catalysts include mineral acids such as sulfuric acid, orthophosphoric acid, and nitric acid, and organic acids such as trichloroacetic acid, formic acid, and oxalic acid. Typically, the pre-hydrolysis is carried out at a pH of from about 1.7 to about 3.5.

Under acidic conditions, the tendency for linear chain extension is stronger than for cross-linking. This accounts for the liquid nature of the partially hydrolyzed organic silicate when in a closed system where solvent can escape and no additional water is added. In the atmosphere, the solvent can evaporate, thereby driving the equilibrium toward the condensed silicate form. Additional water from atmospheric moisture or moisture on the surface to which the composition is applied completes the hydrolysis. The cured coating is a thoroughly cross-linked structure of Si—O—Si bonds. This structure is terminated inside and outside with Si—OH groups.

By itself, the organic silicate does not form a film having integrity and is, therefore, a poor binder. The organic silicate requires the addition of a pigment to become a practical and useful coating binder. Such a pigment is provided for in the present invention by a combination of the rust on the surface to which the coating composition is applied and citric acid, which is present in the coating composition. The citric acid dissolves the rust and forms complexes with the dissolved iron ions to thereby form the pigment upon evaporation of the liquid phase.

The citric acid is present in an amount of at least about 0.01 grams of citric acid per cubic centimeter of composition. Preferably the citric acid is maintained within the range of from about 0.1 to about 0.2 grams per cubic centimeter of coating composition. It is believed that, within the range of from about 0.1 to about 0.2 grams of citric acid per cubic centimeter of coating composition, there is sufficient citric acid to dissolve substantially all of the rust remaining on a rusty surface after hand cleaning, e.g., by means of a wire brush, and to complex substantially all of the dissolved iron ions from such rust.

To facilitate preparation of the coating composition, the citric acid is preferably dissolved in a non-aqueous solvent, such as anhydrous isopropyl alcohol, before being mixed with the organic silicate.

The pH of the coating composition is preferably maintained within the range of from about 3.0 to about 4.5 and more preferably from about 3.5 to about 4.0. The complexes, which are formed between the citric acid and the iron ions of the dissolved rust, are the most stable within such ranges.

The pH of the coating composition may be adjusted to the preferred range by the addition of alkaline or acidic fillers, as required. For example, if the organic silicate is prehydrolyzed at a pH of from about 1.7 to about 3.0, the addition of alkaline fillers, such as zinc oxide, zinc dust, calcium silicate, and the like would be required to raise the pH of the coating composition to the preferred range of 3.5 to 4.0.

Additional solvent may be added to the composition as desired. Generally, increasing the amount of solvent present lengthens cure time, lengthens shelf life, and decreases the viscosity of the coating composition.

In a particularly preferred embodiment of the invention, the coating composition comprises one or more acidic agents in addition to the citric acid to increase the rate of dissolution of the rust into the coating composition. Preferred rust-dissolving agents, such as hydrochloric acid and zinc chloride, provide a source of chloride ions. Zinc chloride is particularly preferred because it is also a metallic pigment which promotes film formation of the organic silicate. It has been found that an amount of from about 6 to about 14 grams and preferably about 8 to about 10 grams of zinc chloride per 100 grams of silicon dioxide in the coating composition will assure proper film formation on any surface to which the coating composition is applied, whether rusty or not.

Coating compositions prepared according to the present invention can be applied to a surface to be treated by conventional techniques such as spraying or brushing. Curing occurs by reaction with moisture absorbed from the atmosphere or from moisture adhering to the surface to which the composition is applied. As can be seen, one unique advantage of the present invention is that the composition can be applied to wet or moist surfaces with excellent adhesion to those surfaces resulting. It is apparent that, if desired, the applied coating can be heated and/or exposed to an additional source of moisture for quick curing.

After prolonged exposure to the atmosphere, coatings formed from the coating compositions of the present invention tend to undergo cracking and peeling. To prevent such cracking and peeling, it is preferred that the coating formed from the coating composition be covered with a topcoat, the purpose of the topcoat being both ornamental and protective. To assure good adhesion between the coating and the topcoat, it is preferred that the topcoat be applied within about four hours after the application of the coating composition onto a surface. Any conventional paint which will adhere to the coating can be used. Alkyd-type paints are presently preferred.

EXAMPLES

Coating compositions were prepared according to the following formulations:

|  | Formulation 1 | | Formulation 2 | |
| --- | --- | --- | --- | --- |
|  | Gal. | Lbs. | Gal. | Lbs. |
| A. Citric Acid Solution[1] | 12.17 | 88.35 | 16.53 | 120 |
| H$_2$O | 6.24 | 51.92 | 2.74 | 22.86 |
| IPA |  |  | 36.56 | 239.461 |
| B. Zinc Chloride Solution[2] | 12.17 | 87.745 | 12.17 | 87.745 |
| C. ES-40[3] | 53.45 | 471.44 | 24.00 | 211.68 |
| IPA | 15.97 | 104.55 | 8.00 | 52.4 |

[1]20% by weight citric acid in isopropyl alcohol
[2]13% by weight zinc chloride in isopropyl alcohol
[3]"Ethyl Silicate-40" from Union Carbide Chemical Company The coating compositions were prepared by adding Parts A and B slowly and with agitation to Part C to control heat generated as a result of the hydrolysis of the ethyl silicate.

Rusted panels were hand cleaned with a wire brush to remove loose rust and sprayed with the above coating compositions. The panels were topcoated with Amercoat 5402, an alkyd paint sold by Ameron, Inc. to a dry-film thickness of two mils. The rusted panels were then exposed to a conventional salt spray. After 500 hours in the salt spray, the panels exhibited good adhesion. Examination of the test panels showed that the corrosion process was completely arrested.

What is claimed is:

1. A process for dissolving rust on a rusted metal substrate and for protecting the substrate against further corrosion comprising:

applying a rusted metal substrate a non-film forming coating composition having a pH of from about 3.0 to about 4.5 comprising: an organic silicate in an amount sufficient to provide at least 12% by weight silicon dioxide in a cured coating from the coating composition;

citric acid in a concentration sufficient to dissolve substantially all of the rust on the substrate;

a non-aqueous solvent;

allowing the coating composition to at least partially cure; and applying a top coat over the coating composition.

2. A process as claimed in claim 1 wherein the organic silicate in the coating composition is ethyl silicate.

3. A process as claimed in claim 1 wherein the organic silicate is present in the coating composition in an amount sufficient to provide from about 12% to about 24% by weight silicon dioxide in a cured coating from the coating composition.

4. A process as claimed in claim 3 wherein the organic silicate is present in the coating composition in an amount which provides from about 14% to about 18% by weight silicon dioxide in a cured coating from the coating composition.

5. A process as claimed in claim 1 wherein the organic silicate in the coating composition is pre-hydrolyzed in an amount of from about 70% to about 90%.

6. A process as claimed in claim 5 wherein the organic silicate in the coating composition is pre-hydrolyzed in an amount of from about 80% to about 85%.

7. A process as claimed in claim 1 wherein the citric acid is present in the coating composition in the coating composition in amount of at least about 0.01 gram per cubic centimeter of the coating composition.

8. A process as claimed in claim 7 wherein the citric acid is present in the coating composition in an amount of from about 0.1 to about 0.2 grams per cubic centimeter of the coating composition.

9. A process as claimed in claim 1 wherein the solvent of the coating composition is selected from the group consisting of isopropyl alcohol, ethanol, butanol, ethylene glycol, ethyl ether, acetone, pentanone, and methylisobutyl ketone.

10. A process as claimed in claim 9 wherein the solvent of the coating composition is isopropyl alcohol.

11. A process as claimed in claim 1 wherein the pH of the coating composition is from about 3.5 to about 4.0.

12. A process as claimed in claim 1 wherein the top coat is applied over the coating composition within about four hours after application of the coating composition.

13. A process for dissolving rust on a rusted metal substrate and for protecting the substrate against further corrosion comprising:

applying to the rusted metal substrate a non-film forming coating composition having a pH of from about 3.0 to about 4.5 comprising:
   ethyl silicate in an amount sufficient to provide from about 12% to about 24% by weight silicon dioxide in a cured coating from the coating composition and wherein the ethyl silicate is pre-hydrolyzed in an amount of from about 70% to about 90%;
   citric acid in an amount of from about 0.1 to about 0.2 grams per cubic centimeter of the coating composition; and
   a non-aqueous solvent;
allowing the coating composition to at least partially cure; and
applying a top coat over the coating composition.

14. A process as claimed in claim 13 wherein the ethyl silicate is present in an amount which provides from about 15% to about 18% by weight silicon dioxide in a cured coating from the coating composition.

15. A process as claimed in claim 13 wherein the ethyl silicate is pre-hydrolyzed in an amount of from about 80% to about 85%.

16. A process as claimed in claim 13 wherein the solvent is isopropyl alcohol.

17. A process as claimed in claim 13 wherein the pH of the coating composition is from about 3.5 to about 4.0.

18. A process as claimed in claim 13 wherein the top coat is applied over the coating composition within about four hours after the application of the coating composition.

* * * * *